United States Patent [19]
Riou

[11] Patent Number: 4,646,328
[45] Date of Patent: Feb. 24, 1987

[54] FRAME ALIGNMENT LOSS AND RECOVERY DEVICE FOR A DIGITAL SIGNAL

[75] Inventor: Armand J. Riou, Paris, France

[73] Assignee: Societe Anonyme de Telecommunications, Paris, France

[21] Appl. No.: 756,228

[22] Filed: Jul. 18, 1985

[30] Foreign Application Priority Data

Jul. 20, 1984 [FR] France .................................. 84 11607

[51] Int. Cl.[4] .............................................. H04L 7/04
[52] U.S. Cl. ....................................... 375/114; 371/67;
340/146.2; 375/116
[58] Field of Search .......................... 375/94, 114, 116;
371/42, 46, 47, 67; 370/105, 106; 364/604;
340/146.2

[56] References Cited

U.S. PATENT DOCUMENTS

| | | | |
|---|---|---|---|
| 3,463,911 | 8/1969 | Dupraz | 371/67 |
| 3,678,200 | 7/1972 | Clark | 375/114 |
| 4,017,684 | 4/1977 | Kurihara et al. | 375/114 |
| 4,205,302 | 5/1980 | Giodo | 375/67 |
| 4,346,475 | 8/1982 | Alexis | 364/604 |

Primary Examiner—Benedict V. Safourek
Assistant Examiner—Stephen Chin
Attorney, Agent, or Firm—Lowe, Price, LeBlanc, Becker & Shur

[57] ABSTRACT

A frame alignment loss and recovery device for a digital signal carrying a frame alignment N-bit word comprises an (N+2)-stage shift register receiving the digital signal at a timing frequency H, a buffer register for extracting (N+2)-bit words from the shift register at a frequency H/3, a logic circuit for comparing each extracted word with three predetermined (N+2)-bit words respectively including N last bits, N central bits and N first bits identical to the alignment word bits in the signal, and a circuit for deriving a frame synchronization pulse in phase with the start of an alignment word contained in an extracted word having bits respectively identical to like-ranked bits in one of the three predetermined words. Because searching for the alignment word is at a frequency H/3, the logic circuit can include conventional PROM memories and alignment word errors can be tolerated despite a digital signal of high rate, for example, 34 Mbit/s.

13 Claims, 4 Drawing Figures

FRAME ALIGNMENT LOSS AND RECOVERY DEVICE FOR A DIGITAL SIGNAL

BACKGROUND OF THE INVENTION

1. Field of the Invention

The present invention relates to frame alignment loss and recovery at a digital transmission path receive end, including e.g., a demultiplexer, and demultiplexing a digital signal into component signals. More particularly, the invention deals with an alignment loss and recovery device for recognizing a periodic synchronization pattern, such as a frame alignment word, carried by the digital signal, to thereby synchronize a time base delivering various clock signals requried for demultiplexing.

2. Description of the Prior Art

In known alignment loss and recovery devices, a shift register receives the digital signal under the control of a recovered clock signal having a digital signal timing frequency. To extract N-bit words at the recovered clock signal rate, the shift register includes N stages, where N is an integer equal to the number of bits in the alignment word. Each extracted N-bit word is compared in a logic comparator against an alignment word stored in a read only memory such that an alignment word can be detected among the extracted words. By detecting the alignment word, it is possible to synchronize the time base with the digital signal frame frequency and to block and unblock the time base in terms of predetermined numbers of detected alignment words as being correct and incorrect as defined per predetermined error rates.

As matters currently stand, propagation time in programmable memories and other analogous logic circuits is longer than a elementary time slot corresponding to a bit in a digital signal having a high bit rate, on the order of several Mbit/s. It is therefore incompatible to recognize the alignment word among the words extracted from the shift register at the high bit rate digital signal timing frequency using usual memories if a tolerance of a few errors on the detected alignment word is required. Indeed, in a memory used as a logic comparator, each extracted word is compared bit by bit with each bit of erroneous and tolerated alignment words. By way of an example, if the alignment word is made up of N bits, the extracted word is compared with N alignment words having 1 erroneous bit if a maximum tolerance of one error is required. The time to process the extracted word increases as the number of tolerated errors increases. The known devices used for digital signals having a bit rate in the range of a few tens of Mbit/s at the most thus rely on a logic circuit that compares each extracted word only against an alignment word having no errors, and hence tolerate no error bits in the detected alignment word. However, a tolerance margin of at least one error in the alignment word would make it possible to hold frame alignment whenever there is a transient error, as is the case with a micro-break or a one-bit shift in the signal upstream of the demultiplexer.

OBJECTS OF THE INVENTION

The main object of this invention is to overcome the drawbacks in the above prior art.

Another object of this invention is to provide a frame alignment loss and recovery device comprising logic circuits, such as memories, exhibiting propagation times, also called transfer or transit times, longer than the elementary period of one bit in a ditigal signal with a high bit-rate, typically greater than 10 Mbit/s.

SUMMARY OF THE INVENTION

In accordance with the above objects, there is provided an alignment loss and recovery device for a digital signal having a periodic frame alignment word having N predetermined bits. The device comprises a shift register having N+2 stages for receiving the digital signal under the control of a clock signal recovered from the digital signal, means for extracting (N+2)-bit words from the shift register at a frequency equal to one third that of the clock signal, means for comparing each of the extracted words with first, second and third predetermined (N+2)-bit words. The last N bits, central N bits and first N bits of the first, second and third predetermined bits are respectively identical to the N bits of the alignment word. A frame synchronization pulse is derived in phase with the start of an alignment word contained in an extracted word having bits respectively identical to bits at the same bit locations in one of the three predetermined words.

The words extracted from the shift register are analyzed at a frequency equal to one third of the digital signal timing frequency, instead of at the timing frequency. A periodic search for the alignment word can therefore be carried out by logic comparing means, such as usual PROM memories, having propagation times of around 50 ns, despite the digital signal high bit rate, typically 34 Mbit/s. Each extracted word is thus compared with the alignment word during three elementary one-bit time slots at the most in the digital signal thereby permitting many comparisons and therefore a typical tolerance of one or two errors in the alignment word.

Additionally, when the digital signal results from demultiplexing with a dejustification in a higher bit-rate signal, e.g. 140 Mbit/s, frame alignment can be maintained when there is a dejustification error. Dejustification such as this can be reflected by the erroneous absence of presence of a justification bit and hence a shift by plus or minus 1 bit in the digital signal. By comparing each extracted word with the three predetermined words, it is possible to detect the alignment word despite the one-bit shift, where synchronizing means are provided to rephase the frame synchronization clock with the start of the detected alignment word.

BRIEF DESCRIPTION OF THE DRAWING

Further features and advantages of the invention will be apparent from the following more particular description of preferred embodiments of the invention as illustrated in the corresponding accompanying drawings in which.

DESCRIPTION OF THE PREFERRED EMBODIMENTS

Figure 1:
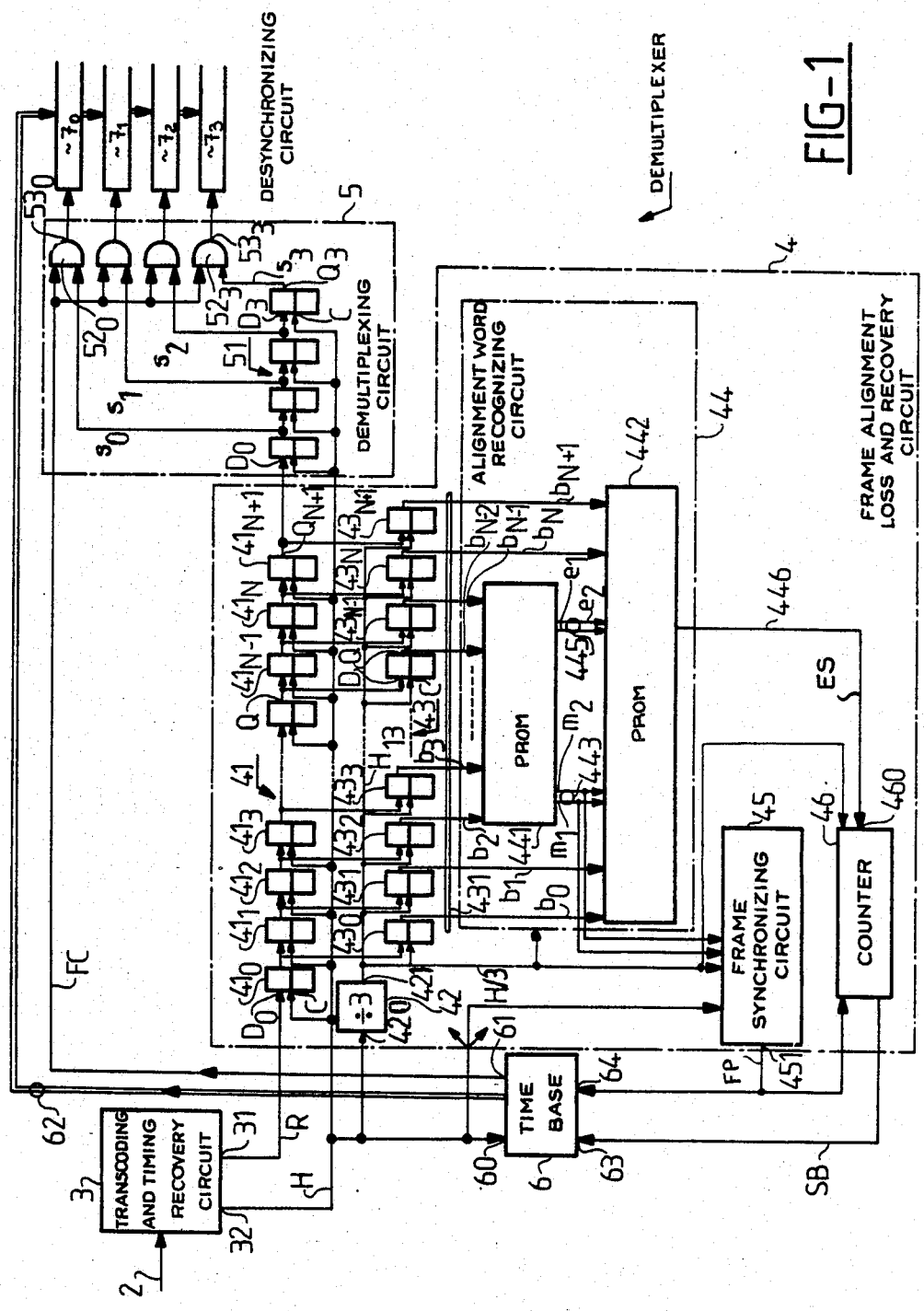
FIG. 1 is a block diagram of a frame alignment loss and recovery circuit embodying the invention, included in a demultiplexer at a received end of a digital transmission line.

With reference to FIG. 1, a receive end 1 of a digital transmission line 2 receives a digital signal having a rate of 34 Mbit/s. The 34 Mbit/s signal is one of four plesiochronous signals obtained by demultiplexing a digital signal having a high rate equal to 140 Mbit/s, in a demultiplexer forming a transmission end of line 2. The 34 Mbit/s signal is made up of four multiplexed digital signals each having a low rate of 8 Mbit/s. The receive end 1 thus forms a demultiplexer. The aforesaid multiplexing and demultiplexing operations are performed by known justification, or stuffing, and dejustification, or unstuffing methods. By way of an example, the 140 Mbit/s signal has justification indication bits indicating the presence and absence of justification bits in relation respectively to the four plesiochronous 34 Mbit/s signals in order to make them synchronous by means of a rate substantially higher than their initial nominal rate. Furthermore, it is known that a digital signal resulting from multiplexing is organized in recurring frames indicated by a synchronizing pattern such as a predetermined frame alignment word. The alignment word included in the resultant 34 Mbit/s signal typically has $N=12$ predetermined consecutive bits.

In practice, the received 34 Mbit/s digital signal is coded using a line code such as an HDBn code. A transcoding and timing recovery circuit 3 decodes the received digital signal into a resultant binary coded signal R. An output 31 of circuit 3 feeds the signal R to input $D_0$ of first stage $41_0$ in a shift register 41. Register 41 is included in a frame alignment loss and recovery circuit 4 peculiar to the invention. The resultant signal R is delivered via an output $Q_{N+1}$ from a last stage $41_{N+1}$ in the register 41 to an input $D_0$ of a first stage of four stage shift register 51. Clock inputs C of all the stages in register 41 and 51 receive a clock signal H recovered by the circuit 3 and transmitted from an output 32 thereof with the 34 MHz frequency of the resultant signal R. The clock signal H is also delivered to an input 420 of a divide-by-3 frequency divider 42 contained in the circuit 4 and to an input 60 of a time base 6.

Register 51 is included in a demultiplexing circuit 5. Circuit 5 comprises four AND gates $52_0$ to $52_3$, each having first inputs respectively connected to outputs Q from the four stages in register 51. Control inputs of gates $52_0$ to $52_3$ are connected to an output 61 of the time base delivering clock signal at the time frequency FC of the four multiplexed synchronous 8 Mbit/s component signal $s_0$ to $s_3$ in the signal R. The circuit 5 thus forms a series-to-parallel converter. Outputs $53_0$ to $53_3$ of the gates $52_0$ to $52_3$ respectively apply signals $s_0$ to $s_3$ to four desynchronizing circuits $7_0$ to $7_3$. Circuits $7_0$ to $7_3$ receive various clock signals produced by frequency division in time base 6 via bus 62 to dejustifying the signals $s_0$ to $s_3$ into corresponding 8 Mbit/s plesiochronous signals.

The various clock signals derived in time base 6 must be synchronized with the frame alignment word AW in the resultant signal R. This is a necessary condition for suitably demultiplexing the component signals in the circuit 5 and for enabling circuits $7_0$ to $7_3$ to detect and extract the justification indication bits and the justification bits having predetermined locations in the frame of the 34 Mbit/s signal R. The alignment loss and recovery circuit 4 is designed to detect the frame alignment word AW in the signal R such that the word AW forms a time-reference for the time base 6 when the time base derives the various clock signals. When the frame alignment word is not recognized during several consecutive frame periods, as will be seen hereinafter, time base 6 is blocked since the received resultant signal R is disturbed. Under these conditions, the information initially carried by the component signals $s_0$ to $s_3$ is lost because a demultiplexing operation on the resultant signal would give rise to component signals devoid of all meaning. A blocking input 63 of the time base 6 then receives a blocking signal SB derived by circuit 4 such that the time base stays blocked until such time as an alignment word having the characteristics defined later has been detected during a frame period. Time base blockage results in the same effect on frequency dividers, such as cyclic or modulo counters, contained in the time base and reset as soon as the blocking signal is interrupted.

Figure 2A:
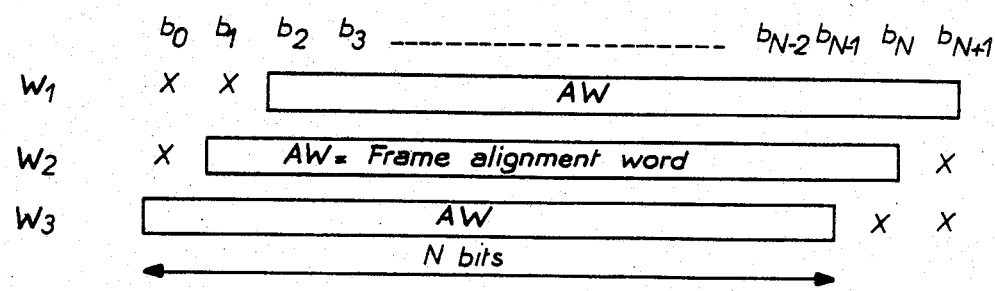
FIG. 2A are bit diagrams representing a shift by plus and minus one bit in three frame alignment words extracted from a shift register.
Figure 2B:
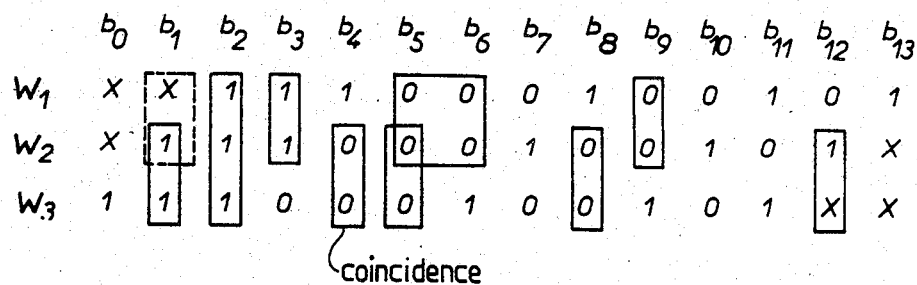
FIG. 2B is analogous to FIG. 2A and corresponds to a specific 12-bit alignment words.

As already state, the 34 Mbit/s frame alignment word cannot be recognized at the rate of the clock signal H, i.e. at the timing of a 1-bit shift in the register 41, as 34 MHz frequency is too fast with respect to the propagation time peculiar to the usual memory circuits and programmable logic arrays such as programmable read only memories (PROMS). These propagation times are two to three times longer than an elementary time slot of approximatively 30 ns filled by a bit in the 34 Mbit/s signal. According to the invention, the frame alignment word AW is sought ever third period of the clock signal H, and the binary content in register 41 is analyzed every third received bit in the resultant signal R. When an alignment word AW having N bits appears in the register 41, said word can be shifted plus or minus one bit since a clock signal having a frequency H/3 is not, a priori, in phase with the alignment word. It is inferred through these conditions that the shift register must contain $N+2$ stages $41_0$ to $41_{N+1}$. There are three predetermined words $W_1$, $W_2$ and $W_3$ containing the alignment word, which are likely to indicate the start of a frame over three consecutive elementary time slots; each of words $W_1$, $W_2$ and $W_3$ has $N+2$ bits, $b_0$ to $b_{N+1}$. As depicted in FIG. 2A, the alignment word AW is in the middle of word $W_2$ and is shifted by one bit in each of words $W_1$ and $W_3$ compared to the word $W_2$. In FIGS. 2A and 2B, a cross is used to indicate any bits in the signal R before and after the alignment word AW.

As shown in FIG. 1, the operation of looking for the alignment word with frequency H/3 is carried out using a buffer register 43 having $N+2$ stages $43_0$ and $43_{N+1}$. The stages in the registers 41, 43 and 51 are D-type flips-flops. Inputs D of stages $43_0$ to $43_{N+1}$ are respectively connected to outputs Q from stages $41_0$ to $41_{N+1}$ in register 41. A transfer of the contents of register 41 to the register 43 is controlled by the clock signal H/3 delivered from an output 421 of the divide-by-3 frequency divider 42 to clock inputs C of each stage of the register 43. Parallel outputs Q of the stages $43_0$ to $43_{N+1}$ transmit, at frequency H/3, the binary content $b_0$ to $b_{N+1}$ in register 41 to an alignment word recognizing circuit 44 via a $N_30 2$-lead bus 431.

Circuit 44 compares each word on the bus 431 with the three predetermined words $W_1$, $W_2$ and $W_3$ and indicates whether one of the three words $W_1$, $W_2$ and $W_3$ is detected with zero, one, two or more than two errors. In the illustrated embodiment, circuit 44 comprises essentially two PROMS 441 and 442. Inputs of the first memory 441 are connected to the outputs Q from $N-2$ central stages $43_2$ to $43_{N-1}$ of register 43 via bus 431. Memory 441 receives N+2 bits $b_2$ to $b_{N-1}$ that all normally belong to the frame alignment word AW when one of words $W_1$, $W_2$ and $W_3$ is being detected, as depicted in FIG. 2A. In practice, the extracted bits $b_2$ to $b_{N-1}$ are compared with the N−2 central bits of the various compositions of each of words $W_1$, $W_2$ and $W_3$ having 0, 1, and I=2 erroneous bits. When the bits $b_2$ to $b_{N-1}$ correspond to those in any of words $W_1$, $W_2$ or $W_3$ to within I=2 errors at the most, the memory 441 supplies bus 443 in a respective address word having two bits $m_1$ and $m_2$, such as "00", "01" or "10", thence to the second memory 442 and a frame synchronizing circuit 45. Simultaneously with read out of the address word $m_1m_2$, the memory 441 delivers to memory 442, via bus 445, an error word having two bits $e_1$ and $e_2$. The word $e_1e_2$ is equal to "00", "01" or "10" when the N−2 bits $b_2$ to $b_{n-1}$ analyzed in the memory 441 are respectively identical or identical to within one or I=2 with the N−2 central bits in the words $W_1$, $W_2$ or $W_3$. When there are at least I+1=3 errors, the extracted word $b_0$ to $b_{N+1}$ is regarded as not containing the alignment word AW and the binary word $e_1e_2$ is equal to "11". When none of the words $W_1$, $W_2$ and $W_3$ is recognized, the words $m_1m_2$ and $e_1e_2$ are equal to "11".

The second memory 442 compares the remaining extracted bits $b_0$, $b_1$, $b_N$ and $b_{N+1}$ on bus 431 with the corresponding bits in the words $W_1$, $W_2$ and $W_3$. The comparison is made in terms of the address $m_1m_2$ of the word $W_1$, $W_2$, $W_3$ on bus 443. If $m_1m_2$ is equal to "00", only the bits $b_N$ and $b_{N+1}$ are compared with the corresponding bits in the word $W_1$; if $m_1m_2$ is equal to "01", only the bits $b_1$ and $b_N$ are compared with the corresponding bits in the word $W_2$; lastly, if $m_1m_2$ is equal to "10", only the bits $b_0$ and $b_1$ are compared with the corresponding bits in the word $W_3$. In contrast, memory 442 makes no comparison when the word $m_1m_2$ is equal to "11" and corresponds to a word transmitted in bus 431 that differs from the words $W_1$, $W_2$ and $W_3$ or differs just slightly therefrom with at least I+1=3 erroneous bits. The memory 442 adds the number of errors in the N−2 bits $b_2$ to $b_{N-1}$ derived by the memory 441 in the form of the word $e_1e_2$ to the number of errors in the bits $b_0$, $b_1$, $b_N$ and $b_{N-1}$ compared in the memory 442. An error signal ES is derived in the memory 442 and is applied to an input 460 of a counter 46 via a lead 446. Signal ES indicates that the number of detected errors is equal to zero, or is equal to one or two I=2 errors or is strictly greater than I=2.

In the shown embodiment, circuit 44 contains a PROM 441 having a capacity of 4×1024 bits and a PROM 442 having a capacity of 2×256 bits. However, in a simpler embodiment, the memories 441 and 442 can be replaced by a single memory having a binary capacity of 4×16 kbits.

To differentiate between the three predetermined words $W_1$, $W_2$ and $W_3$, i.e. to detect them without any ambiguity while tolerating a predetermined number of errors I on each of them, the alignment word AW must exhibit a given specific self-correlation property chosen such that the number of identical like-rank bits in the words $W_1$, $W_2$ and $W_3$ is as small as possible. In other terms, many bits in the words $W_1$ and $W_3$ differ from the like-rank bits in the word $W_2$, and many bits in the word $W_1$ differ from the like-rank bits in the word $W_3$.

Figure 3:
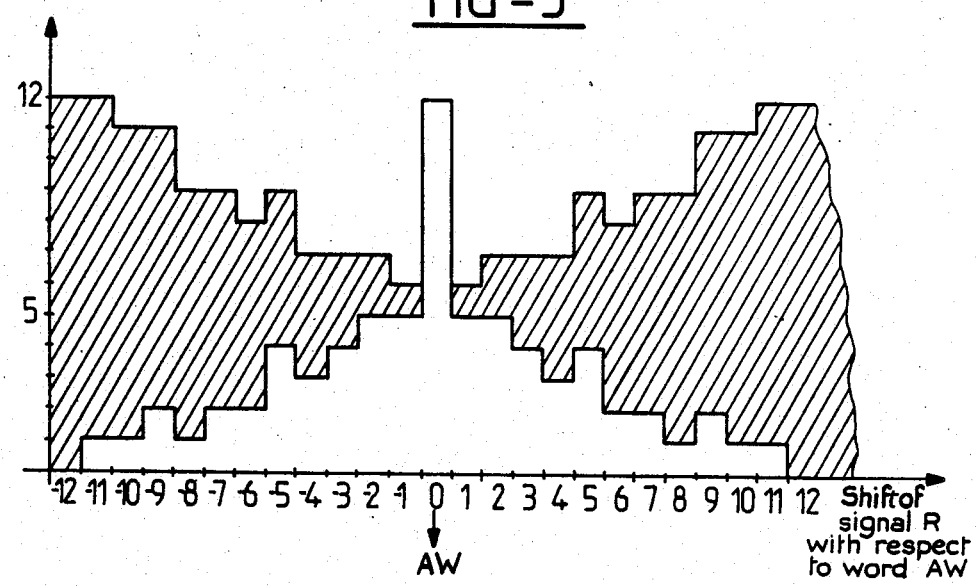
FIG. 3 is a chart showing a frame alignment word self-correlation in connection with FIG. 2B.

Research has shown that for a frame 12 bit alignment word, a number of "anti-coincident" bits obtained by comparing two by two the alignment word AW and the two corresponding words featuring shift by plus and minus one bit can be equal to 5 at the most, thereby making it possible to differentiate between the words $W_1$, $W_2$ and $W_3$ with a tolerance of I=2 errors at the most on each of them. A 12-bit alignment word of this type is for example "111000100101" that preferably forms the frame alignment word AW in the 34 Mbit/s signal R as embodied by the invention. The self-correlation property in relation to this word is displayed in the form of the chart shown in FIG. 3. With reference to FIG. 2B, the self-correlation property is deduced from bit-by-bit comparisons between the alignment word "111000100101" and the word "X11100010010" corresponding to the bits $b_1$ to $b_N$ in the word $W_1$ and the word "11000100101X" corresponding to the bits $b_1$ to $b_N$ in the word $W_3$. A shaded area in FIG. 3 corresponds to a variation in the number of coincidences in terms of the bits X in the digital signal information field for shift factors of 0 to 12 bits on either side of the alignment word AW. The number of possible coincidences, that are boxed in in FIG. 2B, corresponding to identical like-rank bits among the $b_1$ to $b_N$ bits in the word $W_2$ and one of the words $W_1$ and $W_3$ is equal to a minimum of 5 and a maximum of 6 depending on states X for bit $b_1$ in the word $W_1$ and bit $b_N$ in the word $W_3$. For a two-bit shift corresponding to the comparison between the words $W_1$ and $W_3$, the number of possible coincidences between the words $W_1$ and $W_3$ is equal to a minimum of 5 and a maximum of 7. By tolerating no error in detection of all the words $W_1$, $W_2$ and $W_3$, there is always a minimum of 5 anti-coincidence between them. By tolerating one or I=2 errors in detection of the words $W_1$, $W_2$ and $W_3$, the minimum number of anti-coincidences is equal to 3 and 1 respectively thereby providing doubt-free differentiation between the words $W_1$, $W_2$ and $W_3$ in all cases, to ensure that the phase of the H/3 clock signal is determined with respect to the detected alignment word, as seen later.

The frame alignment word can also be represented by $\overline{AW}$=000111011010 that is complementary to the word AW=111000100101, or the word AW*=101001000111 that is symmetrical with the word AW and is obtained by permuting each of the N/2 least significant bits, i.e., bits 1 to N/2, with the N/2 most significant bits, i.e., bits N to (N/2)+1 bit, or the word $\overline{AW^*}$=010110111100 that is complementary to the word AW*. Indeed, the words $\overline{AW}$, AW* and $\overline{AW^*}$ all have the self-correlation property defined above.

In further examples, a 7-bit word, wash as "1110010" and 11-bit words, such as "11100010010" and "10011101101" together with the respective complementary words, symmetrical words and symmetric complementary words exhibit the self-correlation properties required. The word "1110010" allows a tolerance of just one error with a shift of plus and minus one bit and hence provides for a maximum extraction frequency of H/3. The word "11100010010" makes it possible to tolerate one error with a maximum extraction clock frequency of H/5 or two errors with an extraction clock of H/3.

More generally speaking, if the frame alignment word AW has N bits and if there are at least 2I+1 anti-coincidences between the words $W_1$, $W_2$, ... $W_J$ corresponding to J successive 1-bit shifts, then alignment word AW can be detected at a frequency of H/J with a tolerance of I errors on the alignment word.

With reference again to FIG. 1, the frame synchronizing circuit 45 receives the clock signals H and H/3, and the address work $m_1m_2$. Circuit 45 decodes the word $m_1m_2$ to generate a frame pulse FP in phase with the start of the detected alignment word AW, bearing in mind a possible one-bit or two-bit shift at the clock timing H in the $W_1$, $W_2$ and $W_3$ detected words with respect to the effective alignment word location. The frame pulses FP are fed from an output 451 of circuit 45 to a synchronizing input 64 of time base 6. Pulses IT serve as a time reference for the time base 6 such that, based on the clock signal H, the time base can derive the various clock signals on bus 61–62. When the word $m_1m_2$ is equal to "00" and corresponds to detection of the word $W_1$, the start of the detected word AW is in phase with the clock signal H/3, and a frame synchronization pulse $FP_1$ is delivered from output 451 of circuit 45 to synchronizing input 64 of time base 6. When the word $m_1m_2$ is equal to "01" or "10" and corresponds to $W_2$ or $W_3$ detection, a pulse $FP_2$ or $FP_3$ is delayed by one or two elementary time slots with respect to the clock signal H/3 and is transmitted from output 451 of circuit 45. If $m_1m_2$ is equal to "11", the frequency of the frame synchronization pulses goes unchanged with respect to the previously derived frequency that depends on the clock signal H/3. The pulses FR are therefore aligned on the alignment word for each shift with respect to the clock H/3 such that a new shift of plus or minus one bit is possible at a later step. The synchronization pulses received at the input 64 of time base 6 follow fluctuations of at the most two elementary time slots over the frame period in the resultant signal R. Such fluctuations can be due to a dejustification failure in the demultiplexer with the high rate of 140 Mbit/s, implying that a justification bit in the 140 Mbit/s frame has not been extracted or that an information bit has been wrongly extracted, following an inversion of the corresponding justification indication bit.

The counter 46 preferably has $K+2=5$ states and is capable of changing states in synchronism with the frame pulses FP at output 451 of synchronizing circuit 45. Counter 46 further receives the clock signal H/3 from divider 42 in order to take into account the phase shift between the signal H/3 and the information sent by the error signal ES where such a phase shift results from the time to process the extracted word in the circuit 44. A first state relating to counter 46 indicates that circuit 44 has not recognized an alignment word for at least $K+1$ successive frame periods. In other words, when after $K=3$ synchronization pulses FP, no alignment word having a maximum of $I=2$ errors has been detected, frame alignment is considered as lost. Counter 46 is reset and holds time base 6 blocked by a constant state on the input 63 until such time as an alignment word or, to be more precise, until such time as one of the words $W_1$, $W_2$ and $W_3$ has been detected with zero error. This detection with zero error makes it possible to acquire frame alignment while obviating any untimely alignment word imitation, particularly in the digital signal R information field.

Then, whenever one of the words $W_1$, $W_2$ and $W_3$ is being detected with zero error, the counter 46 goes over to a second state. The counter state change is controlled by a signal pulse ES corresponding to a frame pulse FP. When this second state comes about, the counter 46 unblocks the time base 6 by changing the state of the input 63, and alignment is then considered as having been finally acquired.

Until such time as a pulse ES is no longer received by the counter 46, at the same time as a pulse FP, which means detection of an alignment word with two errors at the most, the counter 46 stays in the second state. If a pulse ES is not received at all in response to a pulse FP, counter 46 progesses to a third state. In an analogous manner, counter 46 goes over to a fourth state or a fifth state when two or $K=3$ pulses ES are not received in response to two or $K=3$ consecutive pulses FP. In the third, fourth and fifth states, the time base 6 is held in the unblocked condition by the counter 46. The counter 46 flips back to the second state whenever a pulse ES is received simultaneously with a pulse FP after the counter has flipped to the third, fourth or fifth state. On the other hand, after a frame period following the flip from the fourth to the fifth state, if the counter 46 has not received a pulse ES, counter 46 reverts to the first state and blocks time base 6. As a result, alignment is lost whenever the frame alignment word has not been detected at the frame frequency, with at the most two errors in $K+1=4$ consecutive extracted words having $N+2$ bits, that can be analogous to one of words $W_1$, $W_2$ and $W_3$.

Alignment recovery is acquired whenever an alignment word with zero error is detected. However, in other embodiments of the invention, frame alignment can be considered to have been acquired after k consecutive alignment words with zero error have been detected.

The demultiplexing operation on the resultant 34 Mbit/s digital signal R into four 8 Mbit/s component signals is given as an example. In a further embodiment, the 34 Mbit/s signal is obtained by multiplexing a 32 Mbit/s component signal, such as a digitized television video signal, and a 2 Mbit/s component signal, such as a digitized sound signal.

What I claim is:

1. A frame alignment loss and recovery device for a digital signal having a periodic frame alignment word having N predetermined bits, where N is an integer, said device comprising
    a shift register having N+2 stages for receiving said digital signal under the control of a clock signal recovered from said digital signal,
    means for extracting (N+2)-bit words from said shift register at a frequency equal to one third of said clock signal,
    means for comparing each of said extracted words with first, second and third predetermined words, each of said predetermined words having N+2 bits, said first, predetermined word including N last bits respectively identical to said N alignment word bits, said second predetermined word including N central bits respectively identical to said N alignment word bits, and said third predetermined word including N first bits respectively identical to said N alignment word bits, and
    means connected to said comparing means for deriving a frame synchronization pulse in phase with the start of an alignment word contained in an extracted word, said extracted word having bits at the same locations in the word that are identical to bits at the same location in one of said three predetermined words.

2. The device claimed in claim 1 wherein said extracting means comprises a divide-by-3 frequency dividing means receiving said clock signal, and a buffer register having N+2 stages, said buffer register receiving in parallel the bits contained in said shift register under the control of said frequency dividing means.

3. The device claimed in claim 1 wherein an extracted word is considered to contain said alignment word when at least N−2 central bits in said extracted word are respectively identical to N−2 central bits in one of said three predetermined words.

4. The device claimed in claim 1 wherein an extracted word is considered to contain said alignment word when at least N−(I+2) bits out of N−2 central bits in said extracted word are respectively identical to N−(I+2) bits at the same location in one of said three predetermined words, where I is an integer less than N−2.

5. The device claimed in claim 4 wherein said integer I is equal to or less than 2.

6. The device claimed in claim 4 wherein said comparing means comprises means for respectively comparing said N−2 central bits of each extracted word with N−2 central bits in each of said three predetermined words thereby deriving an address word indicating that said extracted word is considered as containing an alignment word, said address word being provided to said frame synchronization pulse deriving means.

7. A device as claimed in claim 1 comprising timing means receiving said clock signal recovered from said digital signal for deriving timing signals in phase with said frame alignment word, means connected to said comparing means for blocking said timing means whenever K consecutive erroneous alignment words are extracted in said digital signal, where K is an integer, and means connected to said comparing means for unblocking said timing means whenever k consecutive error-free alignment words are extracted in the digital signal, said comparing means delivering an error signal to said blocking and unblocking means to indicate that said alignment word contained in an extracted word considered as containing said alignment word is incorrect when at least I+1 bits in said contained alignment word are erroneous, k being an integer, and I being an integer less than N−2.

8. The device claimed in claim 7 wherein said integer k is equal to 1, and said integer I is equal to or less than 2.

9. The device claimed in claim 7 wherein said comparing means comprises
first comparing means for respectively comparing said N−2 central bits of each extracted word with N−2 central bits in each of said three predetermined words thereby deriving an address word indicating that said extracted word is considered as containing an alignment word, said address word being provided to said frame synchronization pulse deriving means, and said first comparing means deriving a number of errors less than or equal to I for each extracted word considered as containing said alignment word, and
second means receiving said error number for comparing respectively first two bits and last two bits in each extracted word considered as containing said alignment word with first two bits and last two bits in each of said three predetermined words to produce said error signal.

10. The device claimed in claim 1 wherein bits at the same location that differ in said three predetermined words taken two by two are at least 3 or 5 in number.

11. The device as claimed in claim 1 wherein said frame alignment word is such that at least N/2−1 bits thereof out of N−1 bits inclusively located between third and penultimate bits in said first and second predetermined words coincide and such that at least N/2−1 bits thereof out of N−1 bits inclusively located between second and anti-punultimate bits in said second and third predetermined words coincide.

12. The device as claimed in claim 9 wherein said frame alignment word is replaced by one of several words, such as a word complementary to said frame alignment word, a word symmetrical with said frame alignment word, and a word complementary to said symmetrical word.

13. The device as claimed in claim 1 wherein said frame alignment word is 111000100101.

* * * * *